United States Patent
Won et al.

(10) Patent No.: US 11,387,041 B2
(45) Date of Patent: Jul. 12, 2022

(54) MULTILAYER ELECTRONIC COMPONENT

(71) Applicant: SAMSUNG ELECTRO-MECHANICS CO., LTD., Suwon-si (KR)

(72) Inventors: Jae Sun Won, Suwon-si (KR); Jong Duck Kim, Suwon-si (KR); Hae Suk Chung, Suwon-si (KR); Jae Joon Yu, Suwon-si (KR); Won Woo Cho, Suwon-si (KR); Ki Hong Kim, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 0 days.

(21) Appl. No.: 16/854,216

(22) Filed: Apr. 21, 2020

(65) Prior Publication Data
US 2021/0193385 A1    Jun. 24, 2021

(30) Foreign Application Priority Data
Dec. 20, 2019    (KR) ........................ 10-2019-0172195

(51) Int. Cl.
| | |
|---|---|
| *H01G 4/008* | (2006.01) |
| *H01G 4/30* | (2006.01) |
| *H01G 4/40* | (2006.01) |
| *H01G 4/232* | (2006.01) |
| *H01G 4/248* | (2006.01) |

(52) U.S. Cl.
CPC .......... *H01G 4/008* (2013.01); *H01G 4/2325* (2013.01); *H01G 4/248* (2013.01); *H01G 4/30* (2013.01); *H01G 4/40* (2013.01)

(58) Field of Classification Search
None
See application file for complete search history.

(56) References Cited

U.S. PATENT DOCUMENTS

| | | | | |
|---|---|---|---|---|
| 6,765,781 B2* | 7/2004 | Togashi | ................ | H01G 4/232 |
| | | | | 361/303 |
| 7,280,342 B1* | 10/2007 | Randall | ................ | H01G 4/232 |
| | | | | 361/303 |
| 8,310,806 B2* | 11/2012 | Togashi | ................ | H01G 4/30 |
| | | | | 361/306.3 |
| 9,510,443 B2* | 11/2016 | Park | ................ | H01G 4/30 |
| 9,609,753 B2* | 3/2017 | Ahn | ................ | H01G 4/12 |
| 9,786,434 B2* | 10/2017 | Choi | ................ | H01G 4/30 |
| 9,928,957 B2* | 3/2018 | Park | ................ | H01G 4/232 |
| 9,984,827 B2* | 5/2018 | Park | ................ | H01G 4/30 |
| 10,026,550 B2* | 7/2018 | Lee | ................ | H01G 2/065 |
| 10,128,048 B2* | 11/2018 | Park | ................ | H01G 4/228 |

(Continued)

FOREIGN PATENT DOCUMENTS

| | | | |
|---|---|---|---|
| JP | H11-340087 A | | 12/1999 |
| JP | 5811174 B2 | | 11/2015 |
| KR | 10-2016-0054808 A | | 5/2016 |

*Primary Examiner* — Dion R. Ferguson
(74) *Attorney, Agent, or Firm* — Morgan, Lewis & Bockius LLP

(57) ABSTRACT

By controlling shapes of internal electrodes, when short-circuit occurs between the internal electrodes, a short-circuited portion may be opened by an overcurrent, to serve as a fuse. Also, by controlling shapes of internal electrodes, equivalent series inductance (ESL) at a high frequency may be reduced.

17 Claims, 13 Drawing Sheets

(56) References Cited

U.S. PATENT DOCUMENTS

| | | | |
|---|---|---|---|
| 10,269,495 B2* | 4/2019 | Park | H01G 4/30 |
| 10,285,272 B2* | 5/2019 | Park | H01G 4/35 |
| 10,325,722 B2* | 6/2019 | Park | H01G 4/248 |
| 10,395,825 B2* | 8/2019 | Jang | H01G 4/012 |
| 10,468,185 B2* | 11/2019 | Oh | H01G 2/065 |
| 10,699,847 B2* | 6/2020 | Park | H01G 4/005 |
| 10,840,024 B2* | 11/2020 | Lee | H01G 4/232 |
| 2007/0121275 A1* | 5/2007 | Takashima | H01G 4/385 |
| | | | 361/311 |
| 2007/0247783 A1* | 10/2007 | Shimizu | H01G 4/012 |
| | | | 361/278 |
| 2008/0204968 A1* | 8/2008 | Takashima | H01G 4/40 |
| | | | 361/301.4 |
| 2011/0013341 A1* | 1/2011 | Park | H01G 4/228 |
| | | | 361/313 |
| 2014/0022696 A1* | 1/2014 | Banno | H01G 4/002 |
| | | | 361/301.4 |
| 2015/0021078 A1* | 1/2015 | Chae | H01G 4/012 |
| | | | 174/260 |
| 2015/0103468 A1* | 4/2015 | Hwang | H01G 4/30 |
| | | | 361/321.2 |
| 2015/0170841 A1* | 6/2015 | Ahn | H01G 4/30 |
| | | | 174/260 |
| 2016/0133383 A1 | 5/2016 | Park et al. | |
| 2017/0169951 A1* | 6/2017 | Shimada | H01G 4/232 |

\* cited by examiner

I - I'

MULTILAYER ELECTRONIC COMPONENT

CROSS-REFERENCE TO RELATED APPLICATION(S)

This application claims benefit of priority to Korean Patent Application No. 10-2019-0172195 filed on Dec. 20, 2019 in the Korean Intellectual Property Office, the disclosure of which is incorporated herein by reference in its entirety.

TECHNICAL FIELD

The present disclosure relates to a multilayer electronic component.

BACKGROUND

A multilayer ceramic capacitor (MLCC), a type of multilayer electronic component, may be a chip-type condenser mounted on a printed circuit board of various electronic products such as imaging devices including liquid crystal displays (LCDs), plasma display panels (PDPs), and the like, and computers, smartphones, mobile phones, and the like, serving to charge or discharge electricity therein or therefrom.

Recently, as electronic devices become smaller in size and higher in performance, operating frequencies of electronic devices may increase and high frequency noise may occur.

In order to remove such high frequency noise, a multilayer ceramic capacitor (MLCC) may be used. The MLCC may mainly be used to remove high frequency noise of a power terminal of an electronic circuit. The main disadvantage is that since the failure mode may be mostly short-circuited, when the short-circuit of the MLCC occurs, a voltage of the power line may become 0V, to appropriately perform the set no longer. In addition, since most of the MLCCs may be configured in parallel in a circuit, when any one of the MLCCs configured in parallel fails, the circuit will no longer function.

Therefore, the present disclosure proposes a structure in which an MLCC returns to its normal state again by using an overcurrent flowing when a short-circuit occurs in the MLCC to cut off only an internal electrode of a short-circuited sheet.

SUMMARY

An aspect of the present disclosure is to provide a multilayer electronic component including internal electrodes capable of acting as a fuse, such that a short-circuited portion is opened by an overcurrent when short-circuit occurs between the internal electrodes.

Another aspect of the present disclosure is to provide a multilayer electronic component having excellent equivalent series inductance (ESL) characteristics.

However, the object of the present invention is not limited to the above description, and will be more readily understood in the course of describing specific embodiments of the present invention.

According to an aspect of the present disclosure, a multilayer electronic component includes a body including a plurality of dielectric layers, and a plurality of first internal electrodes and a plurality of second internal electrodes, alternately arranged in a first direction with the plurality of dielectric layers respectively interposed therebetween, and including first and second surfaces opposing each other in the first direction, third and fourth surfaces connected to the first and second surfaces and opposing each other in a second direction, and fifth and sixth surfaces connected to the first to fourth surfaces and opposing each other in a third direction; a first external electrode disposed on the third surface and connected to the plurality of first internal electrodes; and a second external electrode disposed on the fourth surface and connected to the plurality of second internal electrodes. Each of first internal electrodes includes a first region, and a first lead portion connected to the first region and exposed from the third surface, and each of the second internal electrodes includes a second region, and a second lead portion connected to the second region and exposed from the fourth surface. The first lead portions in two of the first internal electrodes, adjacent to each other, are arranged so as not to overlap each other in the first direction, and the second lead portions in two of the second internal electrodes, adjacent to each other, are arranged so as not to overlap each other in the first direction. A dimension of each of the first and second lead portions in the third direction is less than a dimension of each of the first and second regions in the third direction.

According to another aspect of the present disclosure, a multilayer electronic component includes a body including a plurality of dielectric layers, and a plurality of first internal electrodes and a plurality of second internal electrodes, alternately arranged in a first direction with the plurality of dielectric layers respectively interposed therebetween, and including first and second surfaces opposing each other in the first direction, third and fourth surfaces connected to the first and second surfaces and opposing each other in a second direction, and fifth and sixth surfaces connected to the first to fourth surfaces and opposing each other in a third direction; a first external electrode disposed on the third surface and connected to the plurality of first internal electrodes; and a second external electrode disposed on the fourth surface and connected to the plurality of second internal electrodes. Each of the plurality of first internal electrodes includes a first region exposed from the third surface, a second region spaced apart from the first region in the first direction, and a first connection portion connecting the first region and the second region, and each of the plurality of second internal electrodes includes a third region exposed from the fourth surface, a fourth region spaced apart from the third region in the first direction, and a second connection portion connecting the third region and the fourth region. The first connection portions in two of the plurality of first internal electrodes, adjacent to each other, are arranged so as not to overlap each other in the first direction, and the second connection portions in two of the plurality of second internal electrodes, adjacent to each other, are arranged so as not to overlap each other in the first direction. A dimension of each of the first and second connection portions in the third direction is less than a dimension of each of the first, second, third, and fourth regions in the third direction.

According to another aspect of the present disclosure, a multilayer electronic component includes a body including a plurality of dielectric layers, and a plurality of first internal electrodes and a plurality of second internal electrodes, alternately arranged in a first direction with the plurality of dielectric layers respectively interposed therebetween, and including first and second surfaces opposing each other in the first direction, third and fourth surfaces connected to the first and second surfaces and opposing each other in a second direction, and fifth and sixth surfaces connected to the first to fourth surfaces and opposing each other in a third direction; a first external electrode disposed on the third surface and connected to the plurality of first internal electrodes; and a second external electrode disposed on the fourth surface and connected to the plurality of second internal electrodes. Each of the plurality of first internal electrodes includes a first region exposed from the third surface, a second region spaced apart from the first region in the first direction, and a first connection portion connecting the first region and the second region, and each of the plurality of second internal electrodes includes a third region exposed from the fourth surface, a fourth region spaced apart from the third region in the first direction, and a second connection portion connecting the third region and the fourth region. Positions of the first and second connection portions are the same in the third direction, but different in the second direction so as not to overlap each other. A dimension of each of the first and second connection portions in the third direction is less than a dimension of each of the first, second, third, and fourth regions in the third direction.

BRIEF DESCRIPTION OF DRAWINGS

The above and other aspects, features, and advantages of the present disclosure will be more clearly understood from the following detailed description, taken in conjunction with the accompanying drawings, in which.

DETAILED DESCRIPTION

Figure 1:
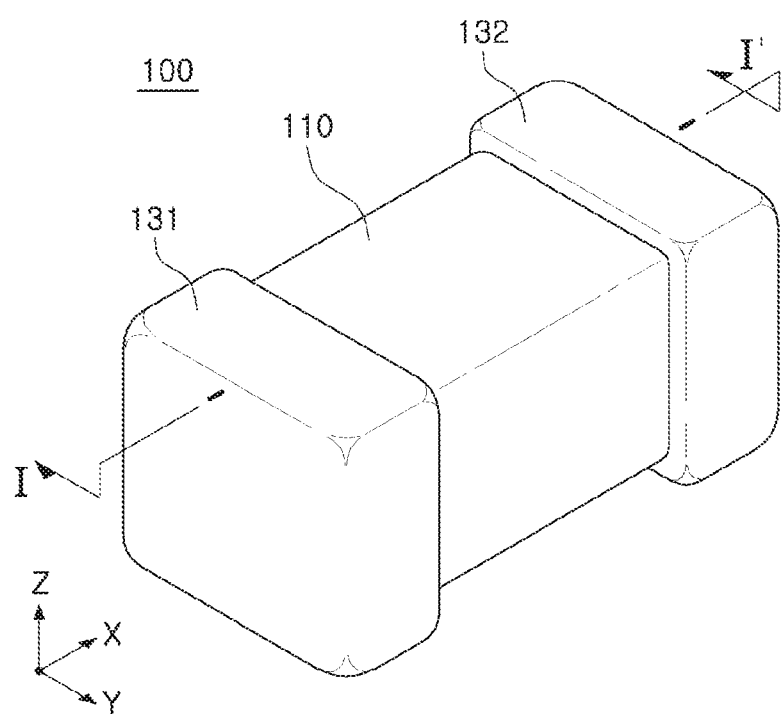
FIG. 1 is a perspective view schematically illustrating a multilayer electronic component according to an embodiment of the present disclosure.

Hereinafter, embodiments of the present disclosure will be described with reference to specific embodiments and the accompanying drawings. However, embodiments of the present disclosure may be modified into various other forms, and the scope of the present disclosure is not limited to the embodiments described below. Further, embodiments of the present disclosure may be provided for a more complete description of the present disclosure to the ordinary artisan. Therefore, shapes and sizes of the elements in the drawings may be exaggerated for clarity of description, and the elements denoted by the same reference numerals in the drawings may be the same elements.

In the drawings, portions not related to the description will be omitted for clarification of the present disclosure, and a thickness may be enlarged to clearly show layers and regions. The same reference numerals will be used to designate the same components in the same reference numerals. Further, throughout the specification, when an element is referred to as "comprising" or "including" an element, it means that the element may further include other elements as well, without departing from the other elements, unless specifically stated otherwise.

In the drawings, an X direction may be defined as a second direction, an L direction, or a longitudinal direction, a Y direction may be defined as a third direction, a W direction, or a width direction, and a Z direction may be defined as a first direction, a stacking direction, a T direction, or a thickness direction.

Multilayer Electronic Component

FIG. 1 is a perspective view schematically illustrating a multilayer electronic component according to an embodiment of the present disclosure.

Figure 2:
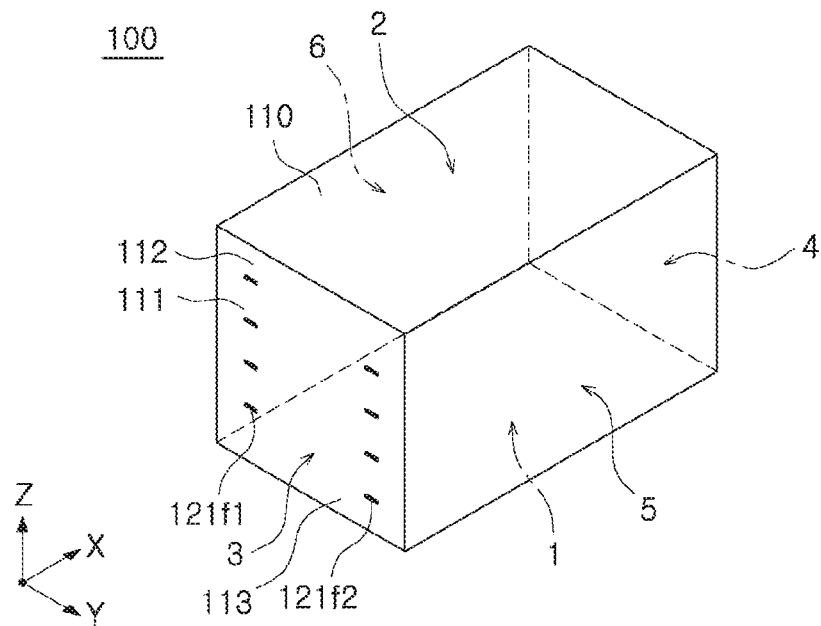
FIG. 2 is a perspective view illustrating a body of the multilayer electronic component of FIG. 1.

FIG. 2 is a perspective view illustrating a body of the multilayer electronic component of FIG. 1.

Figure 3:
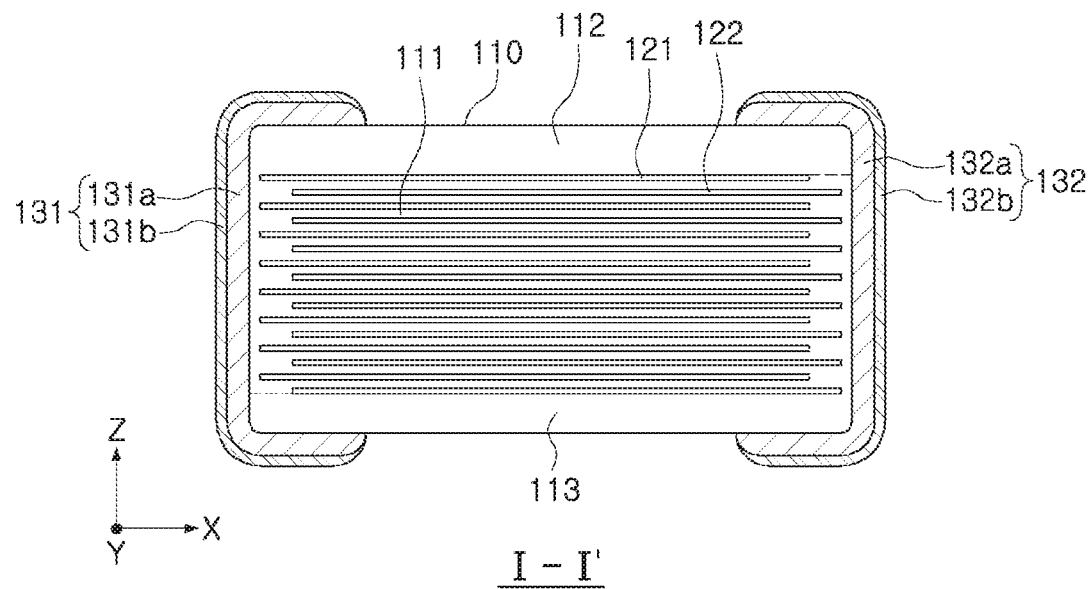
FIG. 3 is a cross-sectional view taken along line I-I' of FIG. 1.

FIG. 3 is a cross-sectional view taken along line I-I' of FIG. 1.

Figure 4:
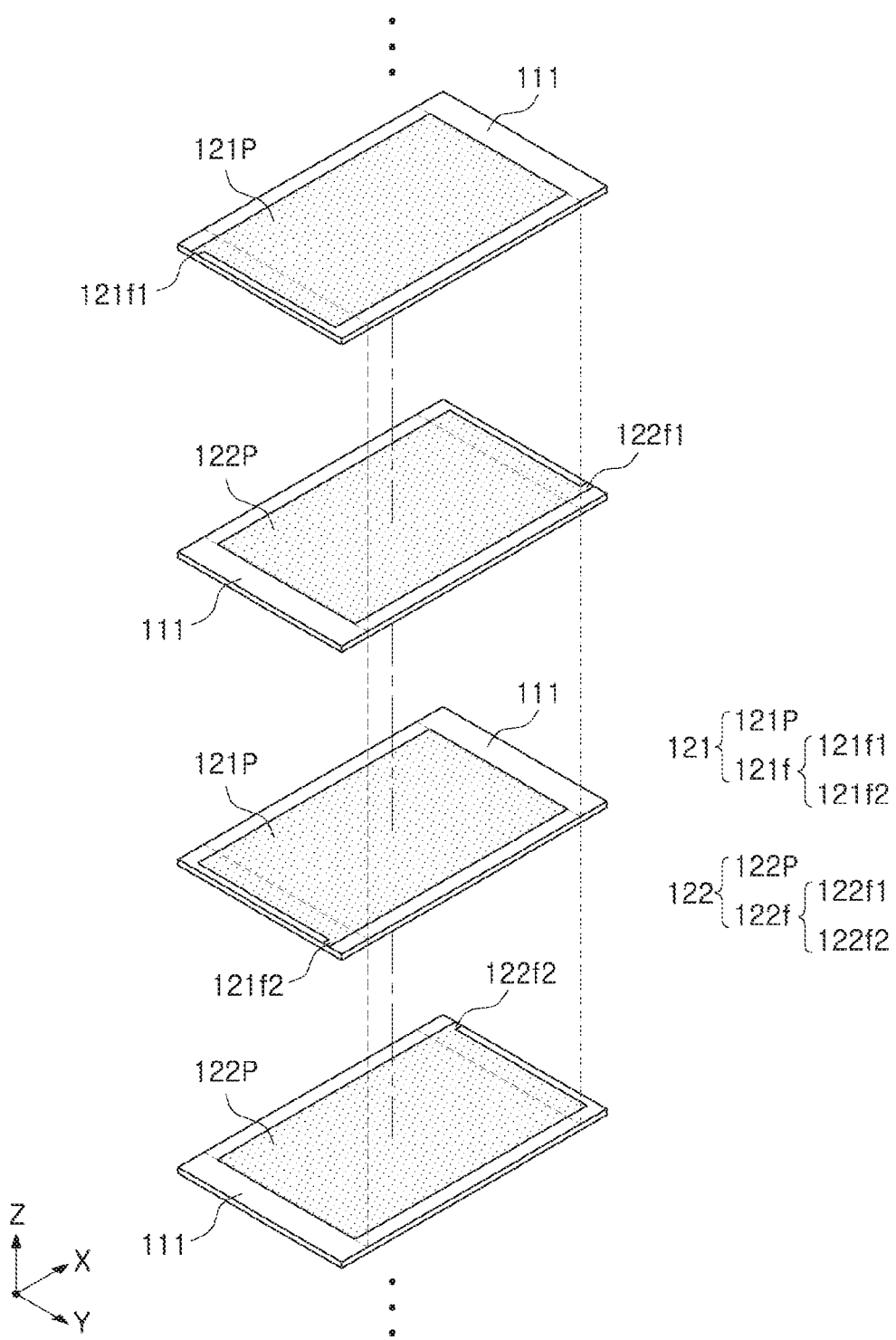
FIG. 4 is an exploded perspective view schematically illustrating a body in which dielectric layers and internal electrodes are stacked, according to an embodiment of the present disclosure.

FIG. 4 is an exploded perspective view schematically illustrating a body in which dielectric layers and internal electrodes are stacked according to an embodiment of the present disclosure.

Figure 5:
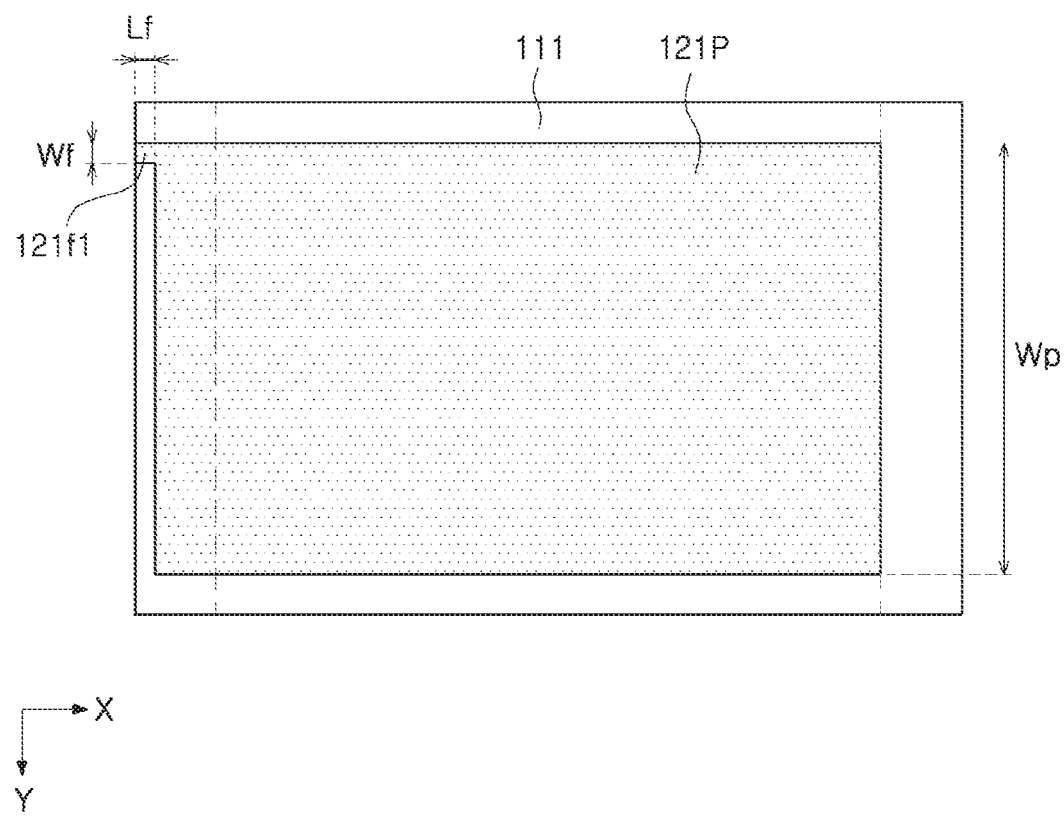
FIG. 5 is a plan view of a first internal electrode according to an embodiment of the present disclosure.

FIG. 5 is a plan view of a first internal electrode according to an embodiment of the present disclosure.

Hereinafter, a multilayer electronic component 100 according to an embodiment of the present disclosure will be described with reference to FIGS. 1 to 5.

A multilayer electronic component 100 according to an embodiment of the present disclosure includes a body 110 including a plurality of dielectric layers 111, and a plurality of first internal electrodes 121 and a plurality of second internal electrodes 122, alternately arranged in a first direction (e.g., a Z direction) with the plurality of dielectric layers respectively interposed therebetween, and including first and second surfaces 1 and 2 opposing each other in the first direction, third and fourth surfaces 3 and 4 connected to the first and second surfaces and opposing each other in a second direction (e.g., an X direction), and fifth and sixth surfaces 5 and 6 connected to the first to fourth surfaces 3 and 4 and opposing each other in a third direction (e.g., a Y direction); a first external electrode 131 disposed on the third surface 3 and connected to the plurality of first internal electrodes 121; and a second external electrode 132 disposed on the fourth surface 4 and connected to the plurality of second internal electrodes 122. The first internal electrodes 121 include first regions 121p, and first lead portions 121f1 and 121f2 connected to the first regions 121p and exposed from the third surface 3, and the second internal electrodes 122 include second regions 122p, and second lead portions 122f1 and 122f2 connected to the second regions 122p and exposed from the fourth surface. The first lead portions 121f1 and 121f2 in the first internal electrodes 121, adjacent to each other, are arranged so as not to overlap each other in the first direction, and the second lead portions 122f1 and 122f2 in the second internal electrodes 122, adjacent to each other, are arranged so as not to overlap each other in the first direction. A dimension of each of the first and second lead portions 121f1, 121f2, 122f1, and 122f2 in the third direction is less than a dimension of each of the first and second regions 121p and 122p in the third direction.

In the body 110, each of the dielectric layers 111 and the internal electrodes 121 and 122 may be alternately stacked.

A shape of the body 110 is not particularly limited, but as illustrated, the body 110 may have a hexahedral shape or a similar shape. Due to shrinkage of a ceramic powder particle contained in the body 110 during a sintering process, the body 110 may have a substantially hexahedral shape, although a hexahedral shape having completely straight lines is not included.

The body 110 may have the first and second surfaces 1 and 2 disposed opposite to each other in the thickness direction (the Z direction); the third and fourth surfaces 3 and 4 connected to the first and second surfaces 1 and 2 and disposed opposite to each other in the length direction (the X direction); and the fifth and sixth surfaces 5 and 6 connected to the first and second surfaces 1 and 2, connected to the third and fourth surfaces 3 and 4, and disposed opposite to each other in the width direction (the Y direction).

The plurality of dielectric layers 111 forming the body 110 may be in a sintered state, and boundaries between neighboring dielectric layers 111 may be integrated such that they may be difficult to identify without using a scanning electron microscope (SEM).

According to an embodiment of the present disclosure, a raw material for forming the dielectric layers 111 is not particularly limited, as long as sufficient capacitance may be obtained. For example, a barium titanate-based material, a lead composite perovskite-based material, a strontium titanate-based material, or the like may be used. The barium titanate-based material may include a $BaTiO_3$-based ceramic powder particle, and examples of the ceramic powder particle may include $BaTiO_3$, or $(Ba_{1-x}Ca_x)TiO_3$, $Ba(Ti_{1-y}Ca_y)O_3$, $(Ba_{1-x}Ca_x)(Ti_{1-y}Zr_y)O_3$, or $Ba(Ti_{1-y}Zr_y)O_3$, in which calcium (Ca), zirconium (Zr), or the like is partially dissolved into $BaTiO_3$, or the like.

As the material for forming the dielectric layers 111, various ceramic additives, organic solvents, plasticizers, binders, dispersants, and the like may be added to powders such as barium titanate ($BaTiO_3$) according to the purpose of the present disclosure.

The body 110 may include a capacity forming portion disposed in the body 110 and including the first internal electrode 121 and the second internal electrode 122 disposed to face each other with the dielectric layer 111 interposed therebetween, to form capacity; and an upper protective layer 112 and a lower protective layer 113 formed on the capacity forming portion, respectively, in upward and downward directions.

The capacity forming portion may be a portion for contributing to formation of capacity of the capacitor, and may be formed by repeatedly stacking the plurality of first and second internal electrodes 121 and 122 with the dielectric layer 111 interposed therebetween.

The upper protective layer 112 and the lower protective layer 113 may be formed by stacking a single dielectric layer or two or more dielectric layers on upper and lower surfaces of the capacity forming portion, respectively, in a vertical direction, and may basically play a role in preventing damage to the internal electrodes due to physical or chemical stress.

The upper protective layer 112 and the lower protective layer 113 may not include an internal electrode, and may include the same material as the dielectric layer 111.

The plurality of internal electrodes 121 and 122 may be arranged to face each other with the dielectric layers 111 interposed therebetween. The internal electrodes 121 and 122 may include first and second internal electrodes 121 and 122 alternately arranged to face each other with the dielectric layers interposed therebetween.

The first internal electrodes 121 may include the first regions 121p, and the first lead portions 121f1 and 121f2 connected to the first regions and exposed from the third surface 3, and the second internal electrodes 122 may include the second regions 122p, and the second lead portions 122f1 and 122f2 connected to the second regions 122p and exposed from the fourth surface 4.

The first and second regions 121p and 122p may be arranged to be spaced apart from the third and fourth surfaces, may not be directly connected to the first and second external electrodes 131 and 132, and may be connected to the external electrodes 131 or 132 through the first and second lead portions 121f1, 121f2, 122f1, or 122f2.

The first external electrode 131 may be disposed on the third surface 3 of the body 110, to be connected to the first internal electrode 121, and the second external electrode 132 may be disposed on the fourth surface 4 of the body 110, to be connected to the second internal electrode 122.

For example, the first internal electrode 121 may be not connected to the second external electrode 132, and may be connected to the first external electrode 131. The second internal electrode 122 may be not connected to the first external electrode 131, and may be connected to the second external electrode 132. Therefore, the first internal electrode 121 may be formed to be spaced apart from the fourth surface 4 by a predetermined distance, and the second internal electrode 122 may be formed to be spaced apart from the third surface 3 by a predetermined distance.

The first and second internal electrodes 121 and 122 may be electrically separated from each other by the dielectric layer 111 disposed therebetween.

The first and second lead portions 121f1, 121f2, 122f1, and 122f2 may be cut off, when the first internal electrode 121 and the second internal electrode 122 are short-circuited to apply an overcurrent. Therefore, the first and second lead portions 121f1, 121f2, 122f1, and 122f2 may serve as a fuse, to be in an open state in which the first internal electrode 121 and the second internal electrode 122 are not electrically connected.

The first internal electrode 121 and the second internal electrode 122 may be short-circuited due to an internal defect, an external shock, an external surge, or the like of the MLCC. In the case of short-circuiting the MLCC, a function of the MLCC may be damaged, and a voltage of a power line may become 0V, which may cause a circuit including an MLCC to malfunction. In addition, since most of the MLCCs are configured in parallel in the circuit, when a failure occurs in any one of the MLCCs configured in parallel, the circuit may no longer be functional.

In the present disclosure, since the internal electrodes 121 and 122 include the lead portions 121f1, 121f2, 122f1, and 122f2 serving as fuses, even though the first internal electrode 121 and the second internal electrode 122 are short-circuited, the lead portions 121f1, 121f2, 122f1, and 122f2 may be cut off by using an overcurrent flowing when a short circuit occurs, to be in an open state in which the first internal electrode 121 and the second internal electrode 122 are not electrically connected. Therefore, the function of the MLCC may be not damaged, and the circuit may be operated normally.

A dimension of each of the first and second lead portions 121f1, 121f2, 122f1, and 122f2 in the third direction (the Y direction) may be less than a dimension of each of the first and second regions 121p and 122p in the third direction (the Y direction). For example, a width of each of the first and second lead portions 121f1, 121f2, 122f1, and 122f2 may be less than a width of each of the first and second regions 121p and 122p. Therefore, when an overcurrent is applied, the first and second lead portions 121f1, 121f2, 122f1, and 122f2 may be cut off to serve as fuses.

Referring to FIG. 5, a width (Wf) of each of the first and second lead portions 121f1, 121f2, 122f1, and 122f2 may be 0.1 mm to 1.0 mm. In this case, the width (Wf) of the first and second lead portions may refer to a dimension of the first and second lead portions in the third direction (the Y direction). When the width (Wf) of each of the first and second lead portions is less than 0.1 mm, electrical connectivity with the external electrodes 131 and 132 may be deteriorated. When the width (Wf) of each of the first and second lead portions exceeds 1.0 mm and even when an overcurrent is applied, the first and second lead portions 121f1, 121f2, 122f1, and 122f2 may be not cut off, and then may not serve as fuses.

In addition, a length (Lf) of each of the first and second lead portions 121f1, 121f2, 122f1, and 122f2 may be 0.1 mm to 1.0 mm. In this case, the length (Lf) of the first and second lead portions may refer to a dimension of the first and second lead portions in the second direction.

When the length (Lf) of the first and second lead portions is less than 0.1 mm, a distance between each of the first and second regions 121p and 122p and each of the external electrodes 131 and 132 may be too short. Therefore, the first region 121p or the second region 122p may be directly connected to the external electrodes 131 and 132, due to tolerance in production or the like, and when the length (Lf) of the first and second lead portions exceeds 1.0 mm, electrical connection with the external electrodes 131 and 132 or the capacitor capacity may be deteriorated.

Referring to FIG. 4, the body 110 may be formed by alternately stacking a dielectric layer 111 on which the first internal electrode 121 is printed and another dielectric layer 111 on which the second internal electrode 122 is printed in the thickness direction (the Z direction), and firing the stacked material.

A material for forming the internal electrodes 121 and 122 is not particularly limited, and a material having excellent electrical conductivity may be used. For example, the internal electrodes 121 and 122 may be formed by printing a conductive paste for the internal electrodes containing one or more of nickel (Ni), copper (Cu), palladium (Pd), silver (Ag), gold (Au), platinum (Pt), tin (Sn), tungsten (W), titanium (Ti), and alloys thereof, on a ceramic green sheet.

As a printing method of the conductive paste for the internal electrodes, a screen-printing method, a gravure printing method, or the like may be used, but the present disclosure is not limited thereto.

The first and second lead portions 121f1, 121f2, 122f1, and 122f2 may include at least one of Fe—Cr—Al alloy, Ni—Cr alloy, Pt, and Mo—W—Ta alloy.

When widths or lengths of lead portions 121f and 122f are relatively narrow or short, the lead portions 121f and 122f may be cut off to be open, even when a slightly high current is applied. Since Fe—Cr—Al alloy, Ni—Cr alloy, Pt, and Mo—W—Ta alloy have a higher melting point than a temperature in using the MLCC, it is possible to prevent the lead portions from breaking before the designed tolerance in current is reached, even when the widths or the lengths of the lead portions 121f and 122f are relatively narrow or short. Therefore, the lead portions may more certainly play the role as fuses.

Therefore, the first and second lead portions 121f1, 121f2, 122f1, and 122f2 may be formed of a material different from the first and second regions 121p and 122p, and may be formed by being printed in a separate manner from the first and second regions 121p and 122p.

When the first lead portions in the first internal electrodes, adjacent to each other, are arranged to overlap each other or the second lead portions in the second internal electrodes, adjacent to each other, are arranged to each other, magnetic fluxes generated in the lead portions may overlap to increase equivalent series inductance (ESL). According to the present disclosure, since the first lead portions 121f1 and 121f2 may be arranged such that the first lead portions in the adjacent first internal electrodes do not overlap each other, and the second lead portions 122f1 and 122f2 may be arranged such that the second lead portions in the adjacent second internal electrodes do not overlap each other, the magnetic fluxes generated in the lead portions may be offset to reduce the ESL. In addition, such an ESL reduction effect may be more remarkable at high frequencies.

Referring to FIGS. 2 and 4, the first lead portion 121f may have two types in which positions of the first lead portion 121f in the third direction are different from each other, and the two types of first lead portions 121f1 and 121f2 may be alternately exposed from the third surface, and the second lead portion 122f may have two types in which positions of the second lead portion 122f in the third direction are different from each other, and the two types of second lead portions 122f1 and 122f2 may be alternately exposed from the fourth surface. According to such a structure, the ESL reduction effect may be further improved.

In this case, one of the two types of first lead portions 121f1 and 121f2 may be disposed on one end of the first region 121p in the width direction, and the other type of first lead portions 121f1 and 121f2 may be disposed on the other end of the first region 121p in the width direction, to further improve the ESL reduction effect. In addition, one of the two types of second lead portions 122f1 and 122f2 may be disposed on one end of the second region 122p in the width direction, and the other type of second lead portions 122f1 and 122f2 may be disposed on the other end of the second region 122p in the width direction, to further improve the ESL reduction effect.

The external electrodes 131 and 132 may be arranged on the body 110, and may be connected to the internal electrodes 121 and 122, respectively.

As illustrated in FIG. 2, first and second external electrodes 131 and 132, disposed on the third and fourth surfaces 3 and 4 of the body 110, respectively, and connected to the first and second internal electrodes 121 and 122, respectively, may be included.

In this embodiment, a structure in which the multilayer electronic component 100 has the two external electrodes 131 and 132 is described, but the number, shape, and the like of the external electrodes 131 and 132 may be changed according to shapes of the internal electrodes 121 and 122, or other purposes.

The external electrodes 131 and 132 may be formed using any material as long as they have electrical conductivity such as metal or the like, may determine a specific material in consideration of electrical characteristics, structural stability, and the like, and may have a multilayer structure.

For example, as illustrated in FIG. 3, the external electrodes 131 and 132 may include electrode layers 131a and 132a disposed on the body 110, and plated layers 131b and 132b formed on the electrode layers 131a and 132a, respectively.

As a more specific example of the electrode layers 131a and 132a, the electrode layers 131a and 132a may be sintered electrodes including a conductive metal and a glass, or resin-based electrodes including a conductive metal and a resin.

In addition, the electrode layers 131a and 132a may have a form in which the sintered electrode and the resin-based electrode are sequentially formed on the body 110. In addition, the electrode layers 131a and 132a may be formed by transferring a sheet including the conductive metal on the body, or may be formed by transferring the sheet including the conductive metal on the sintered electrode. In addition, the first and second electrode layers 131a and 132a may be formed using an atomic layer deposition (ALD) process, a molecular layer deposition (MLD) process, a chemical vapor deposition (CVD) process, a sputtering process, or the like.

The conductive metal used for the electrode layers 131a and 132a is not particularly limited as long as it is a material that may be electrically connected to the internal electrode to form capacitance. For example, one or more selected from the group consisting of nickel (Ni), copper (Cu), palladium (Pd), silver (Ag), gold (Au), platinum (Pt), tin (Sn), tungsten (W), titanium (Ti), and alloys thereof may be included.

As a more specific example of the plated layers 131b and 132b, the plated layers 131b and 132b may be nickel (Ni) plated layers, or tin (Sn) plated layers, may have a form in which the nickel (Ni) plated layers and the tin (Sn) plated layers are sequentially formed on the electrode layers 131a and 132a, and may have a form in which the tin (Sn) plated layer, the nickel (Ni) plated layer, and the tin (Sn) plated layer are formed sequentially. In addition, the plated layers 131b and 132b may include a plurality of nickel (Ni) plated layers and/or a plurality of tin (Sn) plated layers.

Figure 6:
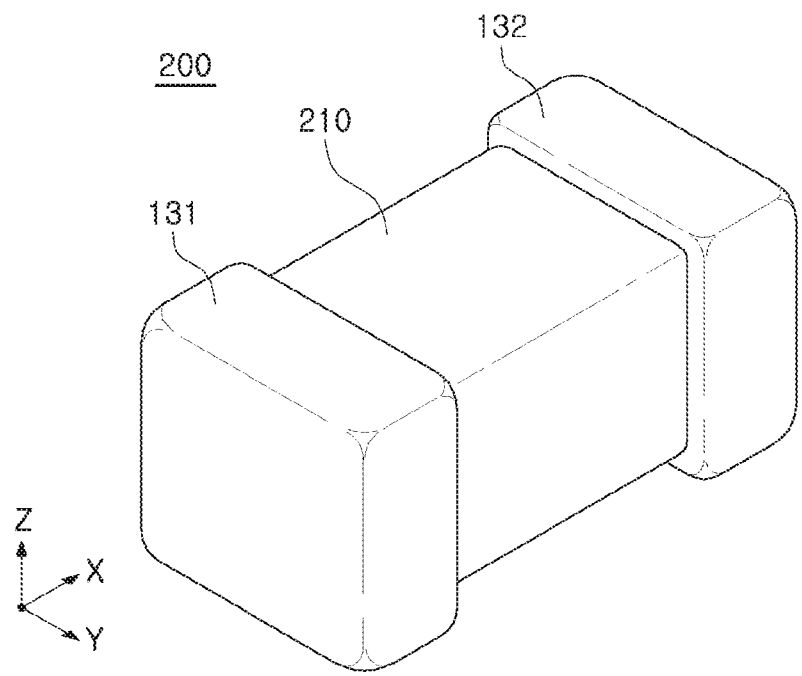
FIG. 6 is a perspective view schematically illustrating a multilayer electronic component according to another embodiment of the present disclosure.

FIG. 6 is a perspective view schematically illustrating a multilayer electronic component according to another embodiment of the present disclosure.

Figure 7:
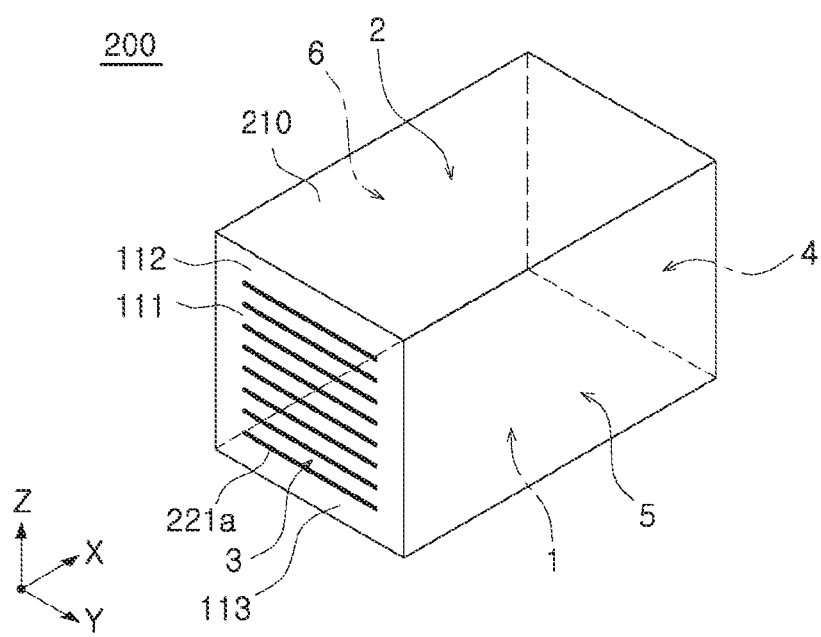
FIG. 7 is a perspective view illustrating a body of the multilayer electronic component of FIG. 6.

FIG. 7 is a perspective view illustrating a body of the multilayer electronic component of FIG. 6.

Figure 8:
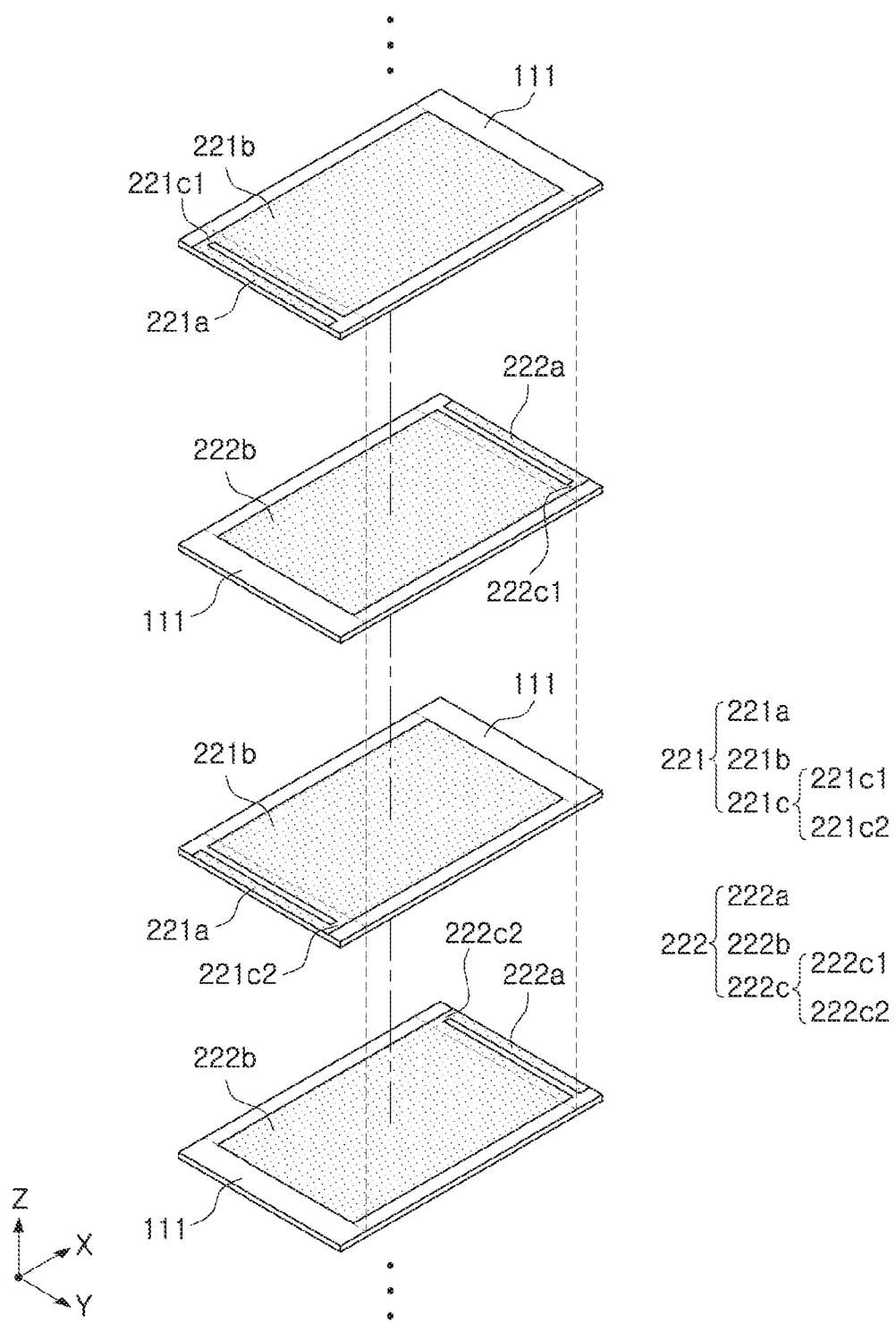
FIG. 8 is an exploded perspective view schematically illustrating an exploded body in which dielectric layers and internal electrodes are stacked according to another embodiment of the present disclosure.

FIG. 8 is an exploded perspective view schematically illustrating an exploded body in which dielectric layers and internal electrodes are stacked according to another embodiment of the present disclosure.

Figure 9:
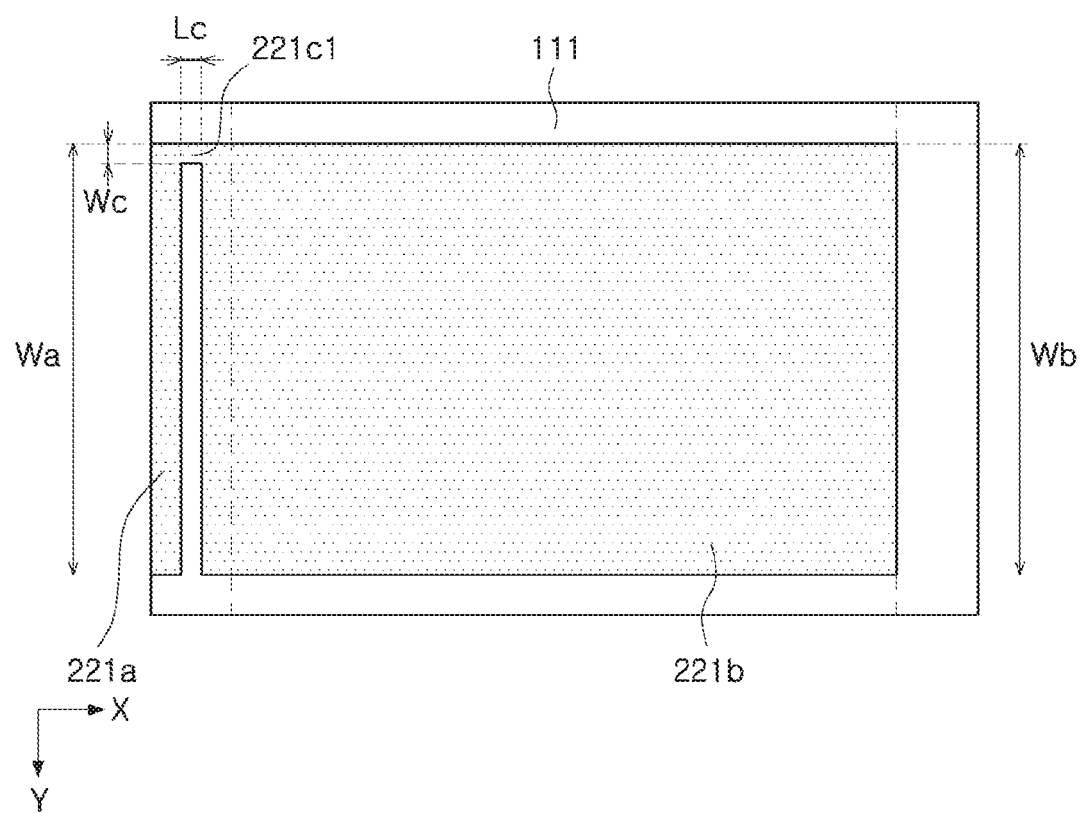
FIG. 9 is a plan view of a first internal electrode according to another embodiment of the present disclosure.

FIG. 9 is a plan view of a first internal electrode according to another embodiment of the present disclosure.

Figure 10:
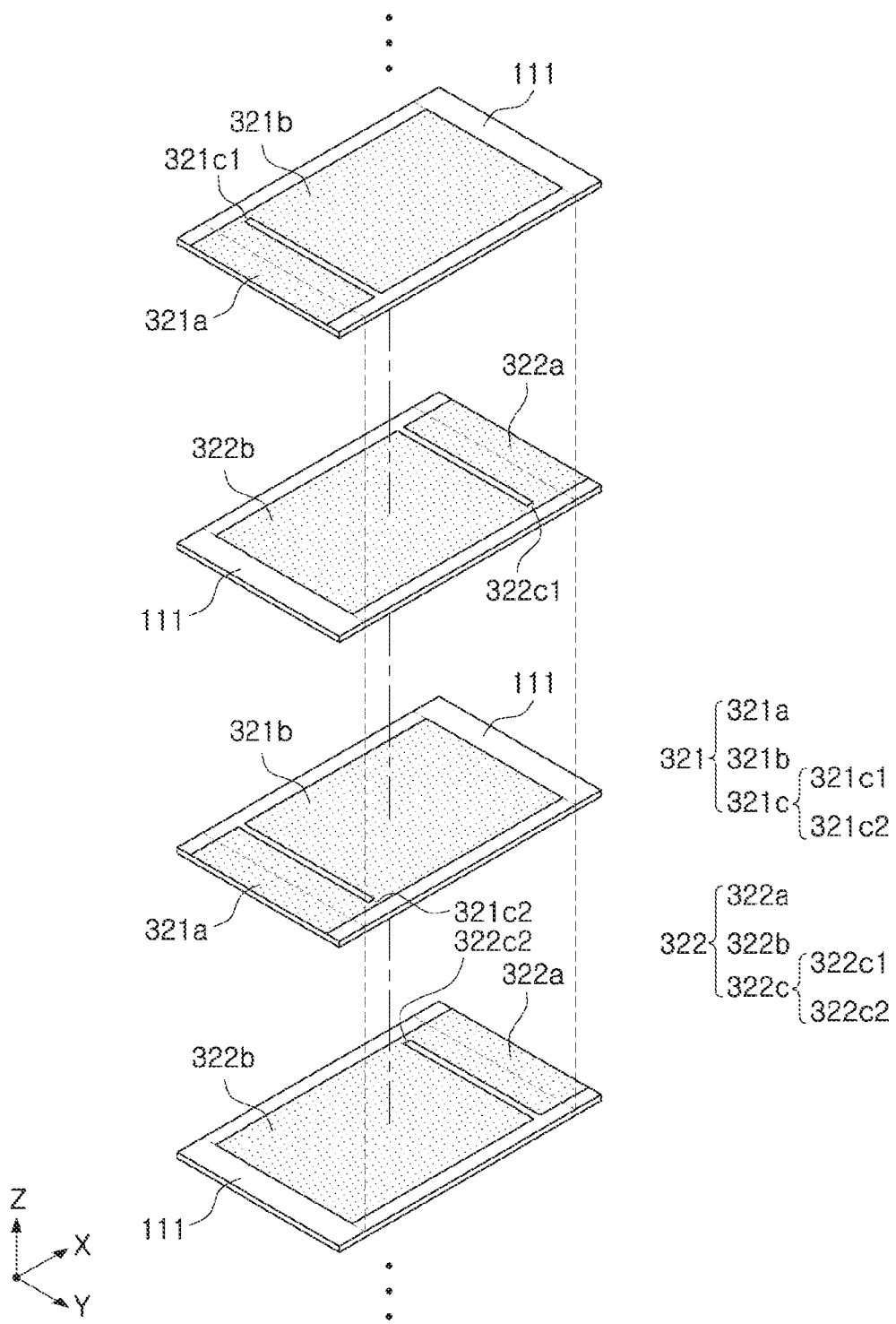
FIG. 10 is an exploded perspective view schematically illustrating an exploded body in which dielectric layers and internal electrodes are stacked according to another embodiment of the present disclosure.

FIG. 10 is an exploded perspective view schematically illustrating an exploded body in which dielectric layers and internal electrodes are stacked according to another embodiment of the present disclosure.

Hereinafter, a multilayer electronic component 200 and a modified example thereof, according to another embodiment of the present disclosure, will be described in detail with reference to FIGS. 6 to 10. However, in order to avoid overlapping descriptions, descriptions common to the multilayer electronic component 100 according to an embodiment of the present disclosure may be omitted.

A multilayer electronic component 200 according to an embodiment of the present disclosure includes a body 210 including a plurality of dielectric layers 111, and a plurality of first internal electrodes 221 and a plurality of second internal electrodes 222, alternately arranged in a first direction (e.g., a Z direction) with the plurality of dielectric layers 111 respectively interposed therebetween, and including first and second surfaces 1 and 2 opposing each other in the first direction, third and fourth surfaces 3 and 4 connected to the first and second surfaces 1 and 2 and opposing each other in a second direction (e.g., an X direction), and fifth and sixth surfaces 5 and 6 connected to the first to fourth surfaces 1 to 4 and opposing each other in a third direction (e.g., a Y direction); a first external electrode 131 disposed on the third surface 3 and connected to the plurality of first internal electrodes 121; and a second external electrode 132 disposed on the fourth surface 4 and connected to the plurality of second internal electrodes 122. The plurality of first internal electrodes 221 include first regions 221a exposed from the third surface, second regions 221b spaced apart from the first regions in the first direction, and first connection portions 221c connecting the first regions and the second regions, and the plurality of second internal electrodes 222 include third regions 222a exposed from the fourth surface, fourth regions 222b spaced apart from the third regions in the first direction, and second connection portions 222c connecting the third regions and the fourth regions. The first connection portions 221c in the plurality of first internal electrodes, adjacent to each other, are arranged so as not to overlap each other in the first direction, and the second connection portions 222c in the plurality of second internal electrodes, adjacent to each other, are arranged so as not to overlap each other in the first direction. A dimension of each of the first and second connection portions 221c and 222c in the third direction is less than a dimension of each of the first and second regions 221a and 221b and the third and fourth regions 222a and 222b in the third direction.

Similarly to the lead portions 121f and 122f of the multilayer electronic component according to the embodiment of the present disclosure, the connection portions 221c and 222c of the multilayer electronic component 200 according to another embodiment of the present disclosure may be cut off, when the first internal electrode 221 and the second internal electrode 222 are short-circuited to apply an overcurrent. Therefore, the connection portions 221c and 222c may serve as a fuse, to be in an open state in which the first internal electrode 221 and the second internal electrode 222 are not electrically connected.

Therefore, the widths, lengths, materials, and the like of the lead portions 121f and 122f may be applied to widths, lengths, materials, and the like of the connection portions 221c and 222c.

Referring to FIG. 9, a width (Wc) of each of the first and second connection portions 221c and 222c may be 0.1 mm to 1.0 mm. In this case, the width (Wc) of each of the first and second connection portions may refer to a distance of the first and second connection portions 221c and 222c in the third direction (the Y direction).

When the width (Wc) of each of the first and second connection portions is less than 0.1 mm, electrical connectivity between the first region 221a and the second region 221b or electrical connectivity between the third region 222a and the fourth region 222b may be deteriorated. When the width (Wc) of each of the first and second connection portions exceeds 1.0 mm and even when an overcurrent is applied, the first and second connection portions 221c and 222c may be not cut off, and then may not serve as fuses.

In addition, a length (Lc) of each of the first and second connection portions 221c and 222c may be 0.1 mm to 1.0 mm. In this case, the length (Lc) of the first and second connection portions may refer to a distance of the first and second connection portions in the second direction.

When the length (Lc) of the first and second connection portions is less than 0.1 mm, a distance between the 1a and second regions or a distance between the 2a and fourth regions may be too short. Therefore, the 1a and second regions or the 2a and fourth regions may be directly connected to the external electrodes 131 and 132, due to tolerance in production or the like, and when the length (Lc) of the first and second connection portions exceeds 1.0 mm, an electrical connection with the external electrodes 131 and 132 or the capacitor capacity may be deteriorated.

According to another embodiment of the present disclosure, the first region of the first internal electrode may be exposed from the third surface, to be connected to the first external electrode, and the third region of the second internal electrode may be exposed from the fourth surface, to be connected to the second external electrode.

When the internal electrodes are connected to the external electrodes through the lead portions 121f and 122f, as in an embodiment of the present disclosure, the electrical connectivity between the external electrodes 131 and 132 and the internal electrodes 121 and 122 may be degraded due to a difference in shrinkage rates between the dielectric layer 111 and the lead portions 121f and 122f, an error in the manufacturing process, and the like.

In another embodiment of the present disclosure, since the internal electrode may be connected to the external electrode through the first region 221a or the third region 222a having a greater width than the connection portion, an electrical connection between the external electrode and the internal electrode may be improved.

In addition, a width (Wa) of each of the first and the third regions may be the same as a width (Wb) of each of the second and the fourth regions.

When the first connection portions 221c in the first internal electrodes 221, adjacent to each other, are arranged to overlap each other, or the second connection portions 222c in the second internal electrodes 222, adjacent to each other, are arranged to overlap each other, magnetic fluxes generated in the connection portions 221c and 222c may overlap to increase ESL. According to another embodiment of the present disclosure, the first connection portions 221c may be arranged such that the first connection portions in the adjacent first internal electrodes do not overlap each other, and the second connection portions 222c may be arranged such that the second connection portions in the adjacent second internal electrodes do not overlap each other, the magnetic fluxes generated in the connection portions 221c and 222c may be offset to reduce the ESL. In addition, such an ESL reduction effect may be more remarkable at high frequencies. In this case, the adjacent first internal electrodes refers that no other first internal electrode is disposed therebetween.

In addition, referring to FIG. 8, the first connection portion 221c may have two types in which positions of the first connection portion 221c in the third direction are different from each other, and the two types of first connection portions 221c1 and 221c2 may be alternately arranged in the first direction, and the second connection portion 222c may have two types in which positions of the second connection portion 222c in the third direction are different from each other, and the two types of second connection portions 222c1 and 222c2 may be alternately arranged in the first direction. According to such a structure, the ESL reduction effect may be further improved.

In this case, one of the two types of first connection portions 221c1 and 221c2 may be disposed on one end of the second region 221b in the width direction, and the other type of first connection portions 221c1 and 221c2 may be disposed on the other end of the second region 221b in the width direction, to further improve the ESL reduction effect. In addition, one of the two types of second connection portions 222c1 and 222c2 may be disposed on one end of the fourth region 222b in the width direction, and the other type of second connection portions 222c1 and 222c2 may be disposed on the other end of the fourth region 222b in the width direction, to further improve the ESL reduction effect.

In addition, the first connection portion 221c may be disposed not to overlap the fourth region 222b, and the second connection portion 222c may be disposed not to overlap the second region 221b. In this case, an area in which the first internal electrode 221 and the second internal electrode 222 overlap each other may increase as much as possible, to increase capacity of the multilayer electronic component.

However, the present disclosure is not limited thereto, and referring to FIG. 10, an exploded perspective view schematically illustrating an exploded body in which dielectric layers and internal electrodes are stacked according to another embodiment of the present disclosure, a first connection portion 321c may be disposed to overlap a region 322b, and a second connection portion 322c may be disposed to overlap a region 321b. In this case, areas of the region 321a and the region 322a may be sufficiently secured, such that electrical connections between internal electrodes 321 and 322 and external electrodes 131 and 132 may be more surely secured.

Figure 11:
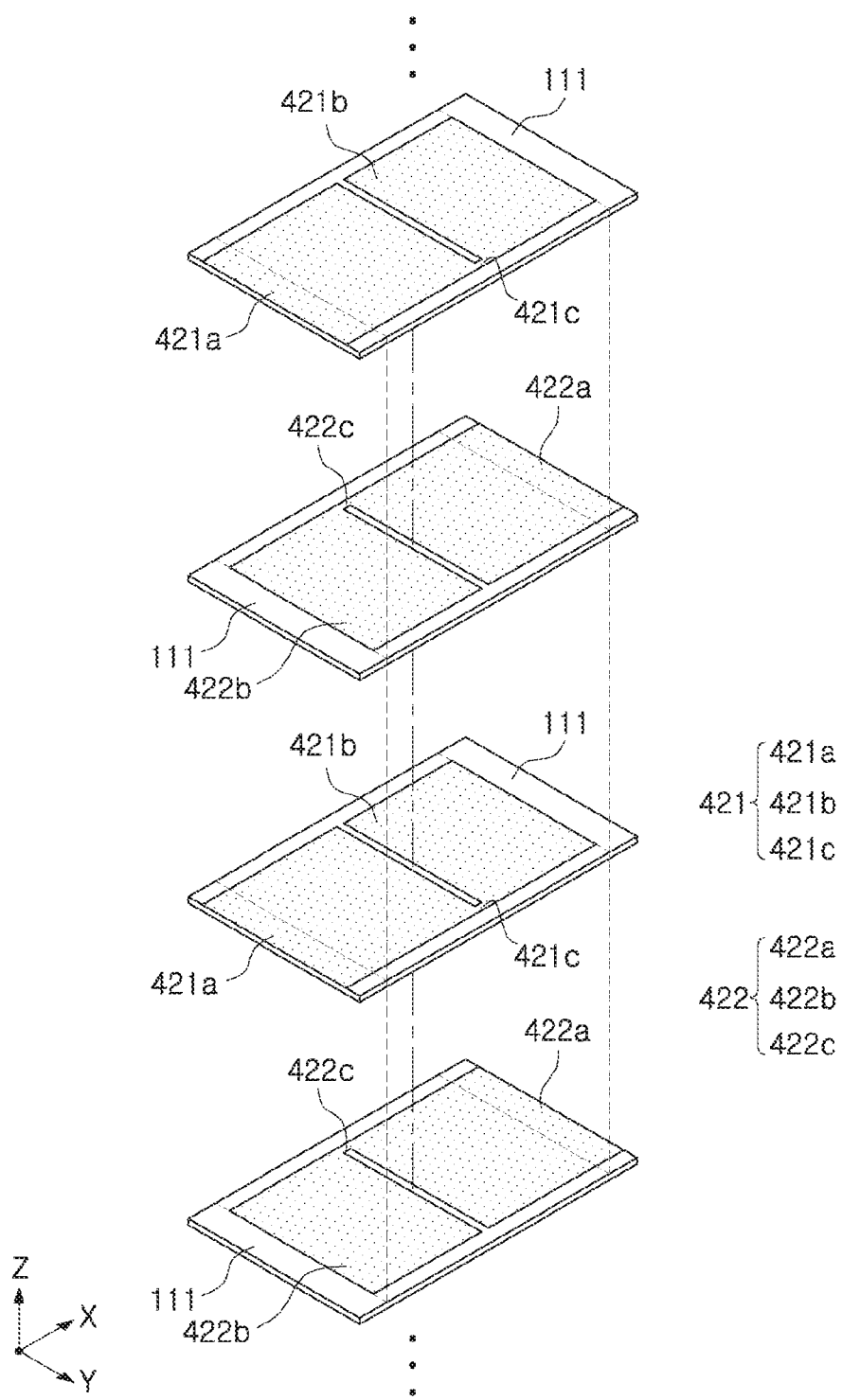
FIG. 11 is an exploded perspective view schematically illustrating an exploded body in which dielectric layers and internal electrodes are stacked according to another embodiment.

FIG. 11 is an exploded perspective view schematically illustrating an exploded body in which dielectric layers and internal electrodes are stacked according to another embodiment.

Referring to FIG. 11, a multilayer electronic component which concerns on another embodiment of the present disclosure may be described. However, in order to avoid overlapping descriptions, descriptions common to the multilayer electronic component which concerns on an embodiment and another embodiment of the present disclosure may be omitted.

A multilayer electronic component according to an embodiment of the present disclosure includes a body including a plurality of dielectric layers 111, and a plurality of first internal electrodes 421 and a plurality of second internal electrodes 422, alternately arranged in a first direction (e.g., a Z direction) with the plurality of dielectric layers respectively interposed therebetween, and including first and second surfaces opposing each other in the first direction, third and fourth surfaces connected to the first and second surfaces and opposing each other in a second direction (e.g., an X direction), and fifth and sixth surfaces connected to the first to fourth surfaces and opposing each other in a third direction (e.g., a Y direction); a first external electrode disposed on the third surface and connected to the plurality of first internal electrodes; and a second external electrode disposed on the fourth surface and connected to the plurality of second internal electrodes. The plurality of first internal electrodes include first regions 421a exposed from the third surface, second regions 421b spaced apart from the first regions in the first direction, and first connection portions 421c connecting the first regions and the second regions, and the plurality of second internal electrodes 422 include third regions 422a exposed from the fourth surface, fourth regions 422b spaced apart from the third regions in the first direction, and second connection portions 422c connecting the third regions and the fourth regions. Positions of the first and second connection portions 421c and 422c are the same in the third direction, but different in the second direction so as not to overlap each other, and a dimension of each of the first and second connection portions 421c and 422c in the third direction is less than a dimension of each of the first and second regions 421a and 421b and the third and fourth regions 422a and 422b in the third direction.

As in another embodiment of the present disclosure, when the first and second connection portions 421c and 422c have the same position in the third direction, influence between the first connection portion 421c and the second connection portion 422c, arranged in a vertical direction, may be greater than influence between the first connection portions 421c of the adjacent first internal electrodes.

Therefore, in another embodiment of the present disclosure, when positions of the first and second connection portions 421c and 422c in the third direction are the same, the positions of the first connection portion 421c and the second connection portion 422c in the second direction may be arranged so as not to overlap each other, to offset magnetic fluxes generated in the connection portions 421c and 422c, to reduce the ESL.

Example

Figure 12:
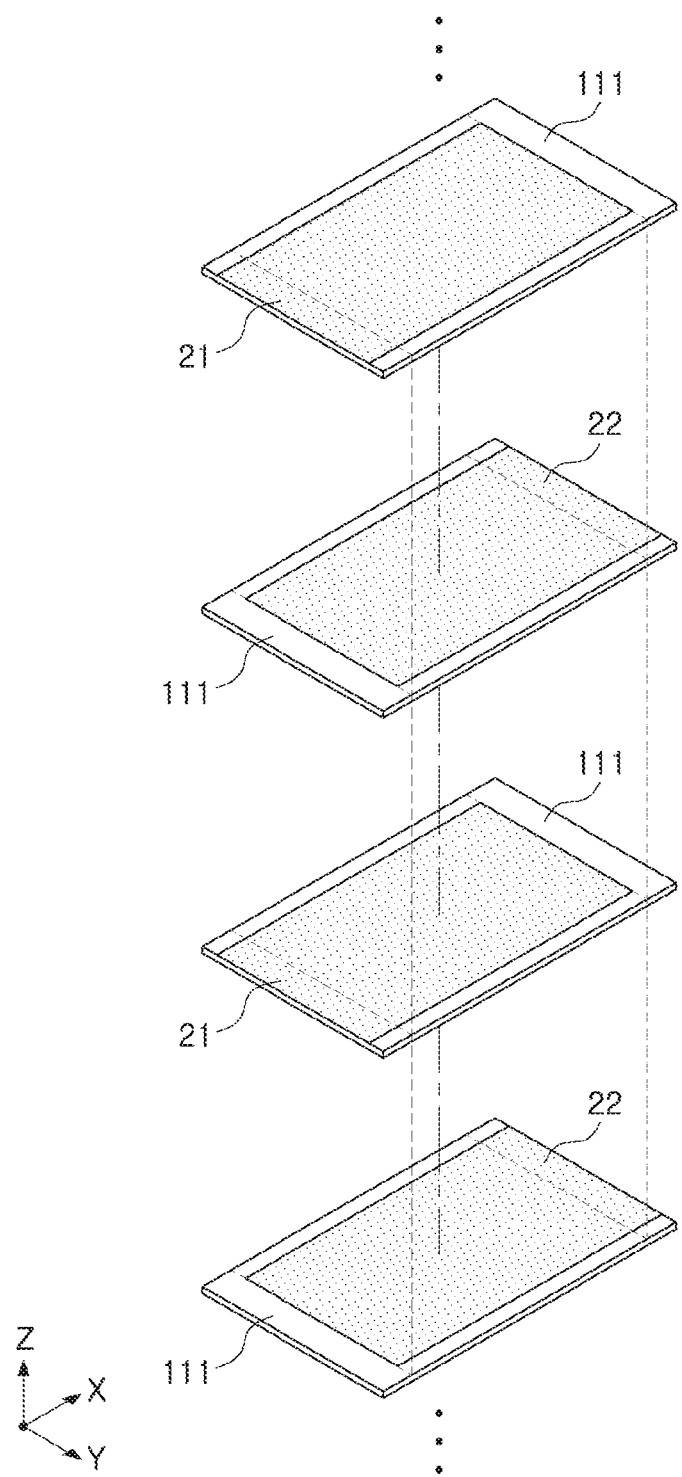
FIG. 12 is an exploded perspective view schematically illustrating a disassembled body in which dielectric layers and internal electrodes according to Comparative Example 1 are stacked.
Figure 13:
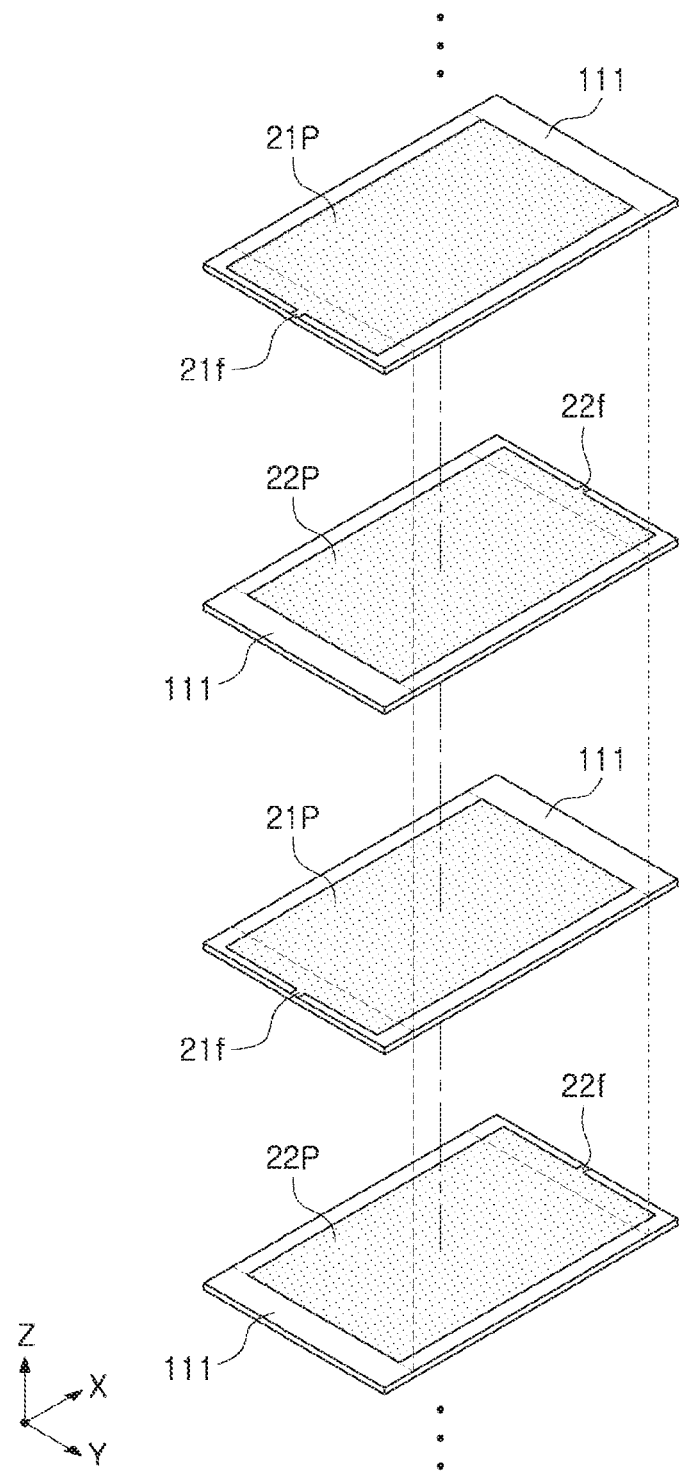
FIG. 13 is an exploded perspective view schematically illustrating a disassembled body in which dielectric layers and internal electrodes according to Comparative Example 2 are stacked.

FIG. 12 is an exploded perspective view schematically illustrating a disassembled body in which dielectric layers and internal electrodes according to Comparative Example 1 are stacked. FIG. 13 is an exploded perspective view schematically illustrating a disassembled body in which dielectric layers and internal electrodes according to Comparative Example 2 are stacked.

As illustrated in FIGS. 12 and 13, Comparative Example 1 is a case in which a conventional internal electrodes 21 and 22 without lead portions 21f and 22f serving as fuses are arranged, and Comparative Example 2 is a case in which lead portions 21f and 22f are arranged to overlap each other.

In Inventive Example of the present disclosure, as illustrated in FIG. 4, the first lead portions 121f1 and 121f2 of adjacent first internal electrodes are arranged so as not to overlap each other, and the second lead portions 122f1 and 122f2 of adjacent second internal electrodes are arranged so as not to overlap each other.

Figure 14:
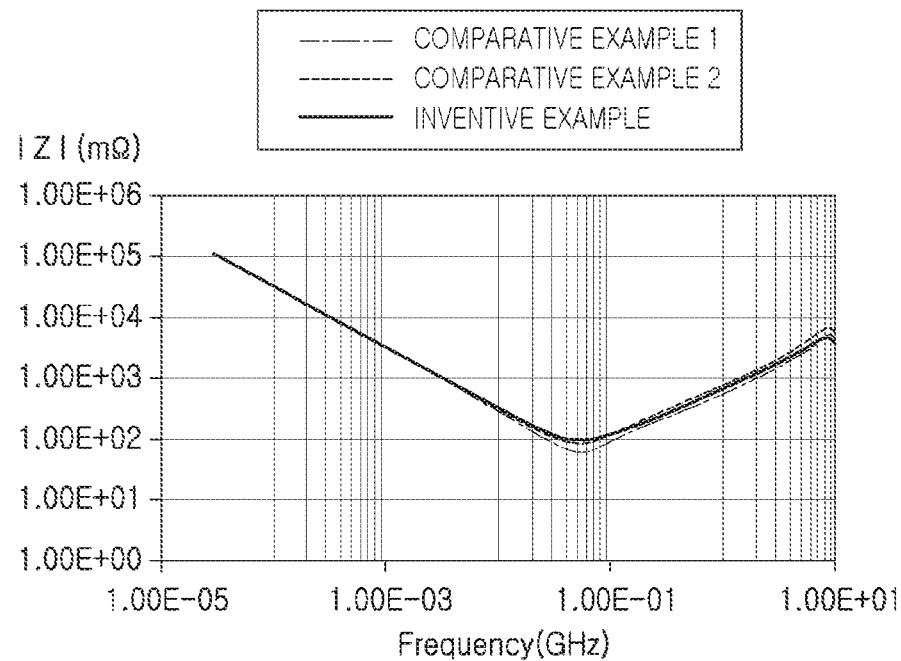
FIG. 14 is a graph comparing impedance characteristics of Inventive Example and Comparative Examples 1 and 2.
Figure 15:
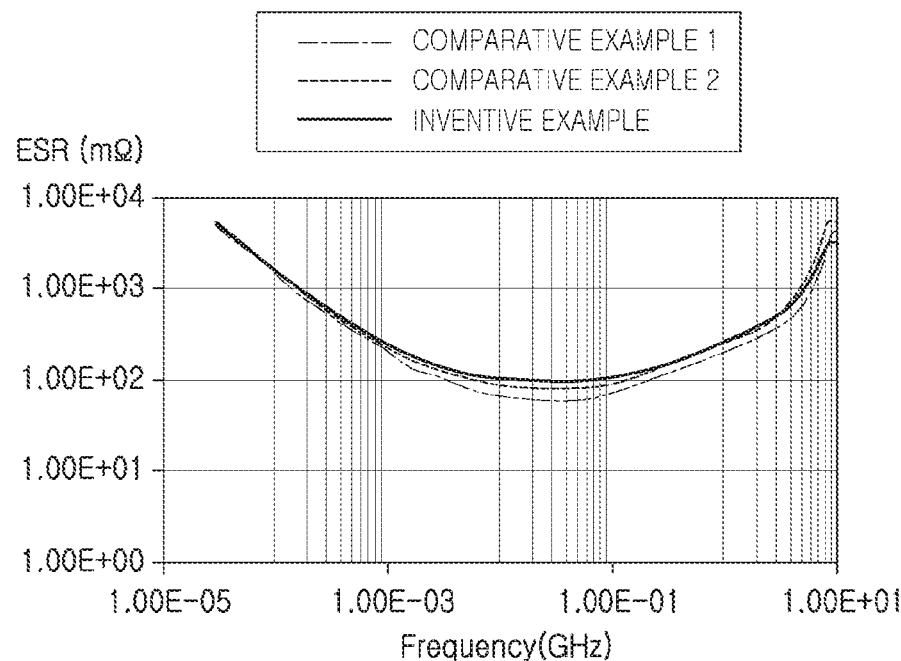
FIG. 15 is a graph comparing ESR characteristics of Inventive Example and Comparative Examples 1 and 2.
Figure 16:
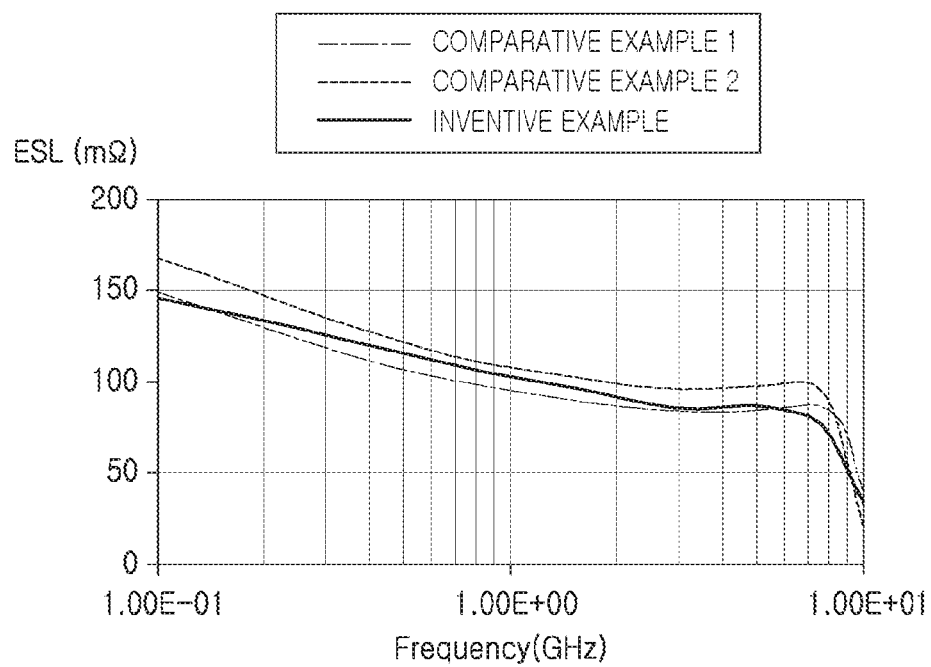
FIG. 16 is a graph comparing ESL characteristics of Inventive Example and Comparative Examples 1 and 2.

Impedance characteristics, ESR characteristics, and ESL characteristics of the Inventive Example and the Comparative Examples 1 and 2 are illustrated in FIGS. 14, 15, and 16.

Referring to FIG. 14, it can be seen that the Inventive Example and Comparative Example 1 in which the lead portions are disposed have slightly increased impedance near a self resonance frequency (SRF), but have similar impedance in general, compared to Comparative Example 2 in which the lead portions are not disposed.

Referring to FIG. 15, it can be seen that the Inventive Example and Comparative Example 1 in which the lead portions are disposed have slightly increased ESR, compared to Comparative Example 2 in which the lead portions are not disposed.

Table 1 below describes ESL values of the Inventive Example and Comparative Examples 1 and 2, depending on frequency.

TABLE 1

| Example | 100 MHz | 500 MHz | 1 GHz | 5 GHz | 8 GHz |
| --- | --- | --- | --- | --- | --- |
| CE1 | 148.05 pH | 106.78 pH | 95.08 pH | 84.68 pH | 83.75 pH |
| CE2 | 166.36 pH | 121.16 pH | 107.70 pH | 97.44 pH | 86.82 pH |
| IE | 146.61 pH | 114.38 pH | 102.27 pH | 86.46 pH | 69.63 pH |

\* In: Inventive Example,
CE: Comparative Example

Referring to Table 1 and FIG. 16, it can be seen that Comparative Example 2 has high ESL at almost all frequencies, compared to the Inventive Example and Comparative Example 1. It can be seen that the Inventive Example has almost the same level of ESL as Comparative Example 1, and, has, in particular, further reduced ESL, compared to Comparative Example 1 at high frequencies, as the frequency increases.

One of effects of the present disclosure is to control shapes of internal electrodes, such that when short-circuit occurs between the internal electrodes, a short-circuited portion may be opened by an overcurrent, to serve as a fuse.

One of effects of the present disclosure is to reduce ESL of a multilayer electronic component, and in particular, to reduce the ESL at a high frequency to improve ESL characteristics.

However, various advantages and effects of the present disclosure are not limited to the above description, and will be more readily understood in the process of describing specific embodiments of the present disclosure.

While example embodiments have been illustrated and described above, it will be apparent to those skilled in the art that modifications and variations could be made without departing from the scope of the present disclosure as defined by the appended claims.

What is claimed is:

1. A multilayer electronic component comprising:
a body including dielectric layers, and first internal electrodes and second internal electrodes, alternately arranged in a first direction with the dielectric layers respectively interposed therebetween, and including first and second surfaces opposing each other in the first direction, third and fourth surfaces connected to the first and second surfaces and opposing each other in a second direction, and fifth and sixth surfaces connected to the first to fourth surfaces and opposing each other in a third direction;
a first external electrode disposed on the third surface and connected to the first internal electrodes; and
a second external electrode disposed on the fourth surface and connected to the second internal electrodes,
wherein each of the first internal electrodes includes a first region spaced apart from the third and fourth surfaces, and a first lead portion connected to the first region and exposed from the third surface,
each of the second internal electrodes includes a second region spaced apart from the third and fourth surfaces, and a second lead portion connected to the second region and exposed from the fourth surface, the first lead portions in two of the first internal electrodes, adjacent to each other, are arranged so as not to overlap each other in the first direction, the second lead portions in two of the second internal electrodes, adjacent to each other, are arranged so as not to overlap each other in the first direction, a dimension of each of the first and second lead portions in the third direction is less than a dimension of each of the first and second regions in the third direction, the dimension of each of the first and second lead portions in the third direction is 0.1 to 1.0 mm, and the first and second lead portions are made of a material different from the first and second regions.

2. The multilayer electronic component according to claim 1, wherein a dimension of each of the first and second lead portions in the second direction is 0.1 to 1.0 mm.

3. The multilayer electronic component according to claim 1, wherein each of the first and second lead portions comprises one or more of Fe—Cr—Al alloy, Ni—Cr, Pt, and Mo—W—Ta alloy.

4. The multilayer electronic component according to claim 1, wherein positions of the first lead portions in the third direction are different from each other, and the first lead portions are alternately exposed from the third surface, and positions of the second lead portion in the third direction are different from each other, and the second lead portions are alternately exposed from the fourth surface.

5. The multilayer electronic component according to claim 1, wherein the first and second regions are spaced apart from the fifth and sixth surfaces, respectively.

6. A multilayer electronic component comprising:

a body including a plurality of dielectric layers, and a plurality of first internal electrodes and a plurality of second internal electrodes, alternately arranged in a first direction with the plurality of dielectric layers respectively interposed therebetween, and including first and second surfaces opposing each other in the first direction, third and fourth surfaces connected to the first and second surfaces and opposing each other in a second direction, and fifth and sixth surfaces connected to the first to fourth surfaces and opposing each other in a third direction;

a first external electrode disposed on the third surface and connected to the plurality of first internal electrodes; and a second external electrode disposed on the fourth surface and connected to the plurality of second internal electrodes, wherein each of the plurality of first internal electrodes includes a first region exposed from the third surface, a second region spaced apart from the first region in the second direction, and a first connection portion connecting the first region and the second region, each of the plurality of second internal electrodes includes a third region exposed from the fourth surface, a fourth region spaced apart from the third region in the second direction, and a second connection portion connecting the third region and the fourth region, the first connection portions in two of the plurality of first internal electrodes, adjacent to each other, are arranged so as not to overlap each other in the first direction, the second connection portions in two of the plurality of second internal electrodes, adjacent to each other, are arranged so as not to overlap each other in the first direction, a dimension of each of the first and second connection portions in the third direction is less than a dimension of each of the first, second, third, and fourth regions in the third direction, the first region is exposed from the third surface in the third direction a length which is greater than the dimension of the first connection portion in the third direction, the third region is exposed from the fourth surface in the third direction a length which is greater than the dimension of the second connection portion in the third direction, at least one of the first connection portions in the two of the plurality of first internal electrodes is arranged so as not to overlap a second connection portion, among the second connection portions and arranged between the two of the plurality of first internal electrodes, in the first direction, and at least one of the second connection portions in the two of the plurality of second internal electrodes is arranged so as not to overlap a first connection portion, among the first connection portions and arranged between the two of the plurality of second internal electrodes, in the first direction.

7. The multilayer electronic component according to claim 6, wherein the dimension of each of the first and second connection portions in the third direction is 0.1 to 1.0 mm.

8. The multilayer electronic component according to claim 6, wherein a dimension of each of the first and second connection portions in the second direction is 0.1 to 1.0 mm.

9. The multilayer electronic component according to claim 6, wherein each of the first and second connection portions comprises one or more of Fe—Cr—Al alloy, Ni—Cr alloy, Pt, and Mo—W—Ta alloy.

10. The multilayer electronic component according to claim 6, wherein the first and second lead portions are made of a material different from the second and fourth regions.

11. The multilayer electronic component according to claim 6, wherein positions of the first connection portions in the third direction are different from each other, and the first connection portions are alternately arranged in the first direction, and positions of the second connection portion in the third direction are different from each other, and the second connection portions are alternately arranged in the first direction.

12. The multilayer electronic component according to claim 6, wherein the first connection portions are disposed not to overlap the fourth regions, and the second connection portions are disposed not to overlap the second regions.

13. The multilayer electronic component according to claim 6, wherein the first connection portions are disposed to overlap the fourth regions, and the second connection portions are disposed to overlap the second regions.

14. A multilayer electronic component comprising:

a body including a plurality of dielectric layers, and a plurality of first internal electrodes and a plurality of second internal electrodes, alternately arranged in a first direction with the plurality of dielectric layers respectively interposed therebetween, and including first and second surfaces opposing each other in the first direction, third and fourth surfaces connected to the first and second surfaces and opposing each other in a second direction, and fifth and sixth surfaces connected to the first to fourth surfaces and opposing each other in a third direction;

a first external electrode disposed on the third surface and connected to the plurality of first internal electrodes; and a second external electrode disposed on the fourth surface and connected to the plurality of second internal electrodes, wherein each of the plurality of first internal electrodes includes a first region exposed from the third surface, a second region spaced apart from the first region in the first direction, and a first connection portion connecting the first region and the second region, and each of the plurality of second internal electrodes includes a third region exposed from the fourth surface, a fourth region spaced apart from the third region in the first direction, and a second connection portion connecting the third region and the fourth region, wherein positions of the first and second connection portions are the same in the third direction, but different in the second direction so as not to overlap each other, and a dimension of each of the first and second connection portions in the third direction is less than a dimension of each of the first, second, third, and fourth regions in the third direction.

15. The multilayer electronic component according to claim 14, wherein the dimension of each of the first and second connection portions in the third direction is 0.1 to 1.0 mm.

16. The multilayer electronic component according to claim 14, wherein each of the first and second connection portions comprises one or more of Fe—Cr—Al alloy, Ni—Cr alloy, Pt, and Mo—W—Ta alloy.

17. The multilayer electronic component according to claim 14, wherein the first and second lead portions are made of a material different from the second and fourth regions.

* * * * *